May 9, 1950 | H. R. MOORE | 2,507,116

POWER LINE CARRIER TELEPHONE SYSTEM

Filed Aug. 17, 1946 | 5 Sheets-Sheet 1

INVENTOR
H. R. MOORE
BY
Robert J. Fluskey
ATTORNEY

May 9, 1950 H. R. MOORE 2,507,116

POWER LINE CARRIER TELEPHONE SYSTEM

Filed Aug. 17, 1946 5 Sheets-Sheet 2

INVENTOR
H. R. MOORE
BY
Robert J. Fluskey
ATTORNEY

INVENTOR
H. R. MOORE
BY
Robert J. Fluskey
ATTORNEY

May 9, 1950 H. R. MOORE 2,507,116

POWER LINE CARRIER TELEPHONE SYSTEM

Filed Aug. 17, 1946 5 Sheets-Sheet 4

INVENTOR
H. R. MOORE
BY
Robert J. Fluskey
ATTORNEY

May 9, 1950 H. R. MOORE 2,507,116

POWER LINE CARRIER TELEPHONE SYSTEM

Filed Aug. 17, 1946 5 Sheets-Sheet 5

INVENTOR
H. R. MOORE
BY
Robert J. Fluskey
ATTORNEY

Patented May 9, 1950

2,507,116

UNITED STATES PATENT OFFICE 2,507,116

POWER LINE CARRIER TELEPHONE SYSTEM

Hilbert R. Moore, Pluckemin, N. J., assignor to Bell Telephone Laboratories, Incorporated, New York, N. Y., a corporation of New York Application August 17, 1946, Serial No. 691,292

8 Claims. (Cl. 179—2.5)

This invention relates to communication systems and means and more particularly to power line carrier frequency telephone systems.

An object of the invention is to simplify and improve communication systems of the power line carrier telephone type.

A feature of the invention involves the allocation of carrier wave frequencies for transmission and signaling into and out of the carrier frequency stations in the system.

Another feature resides in the signaling arrangement between the power line telephone system and an attended switching office for connecting subscriber stations on the power line system with telephone stations outside of such system.

Still another feature comprises combined audible and visual signaling arrangements at the subscriber stations on the power line system, for calls local to the power line system and for calls involving telephone stations outside of the power line system.

A further feature involves the power supply arrangement for the transmitting and receiving circuits at the subscriber stations and the carrier terminal station of the power line system.

A power line carrier telephone system in accordance with the invention comprises a plurality of high frequency subscriber stations and a high frequency terminal station coupled to a power line, the terminal station being connected with an attended position of a conventional central office or a private branch exchange. Each subscriber station is arranged, on calls to a telephone station outside of the power line system by way of the central office or private branch exchange, for transmission on the same high frequency or carrier wave and for receiving on a second high frequency or carrier wave; and, on calls between subscriber stations on the power line, at the same high frequencies in inverted relationship. The carrier terminal station is connected with the central office or private branch exchange over a voice frequency transmission line. The carrier terminal station includes means for converting high frequency signaling currents from the subscriber stations into different signaling currents individual to the separate high frequencies employed in the system, so as to actuate separate indicating means at the central office, whereby the operator or attendant is made aware that a call is either incoming to the central office, or that a call is being made local to the power line telephone system. In the normal or idle conditions of the subscriber station and the carrier terminal station, the transmitting circuits thereat are disabled, but the receiving circuits are continuously energized from an alternating current source, direct current anode potentials being substituted on the electronic devices employed in the receiving circuits when a subscriber's station and the terminal station are in use.

Other objects and features of the invention will be evident from the general and specific descriptions that follow hereinafter.

A better understanding of the invention will be derived from the detailed description that follows, taken in conjunction with the showings of the appended drawings, wherein.

Figure 1:
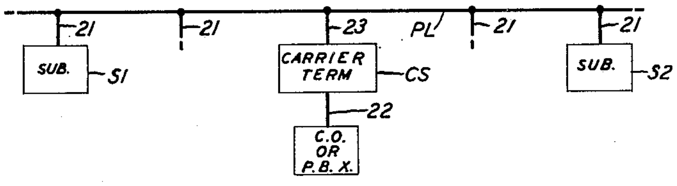
Fig. 1 is a schematic representation of a power line carrier telephone system embodying the invention.
Figure 3:
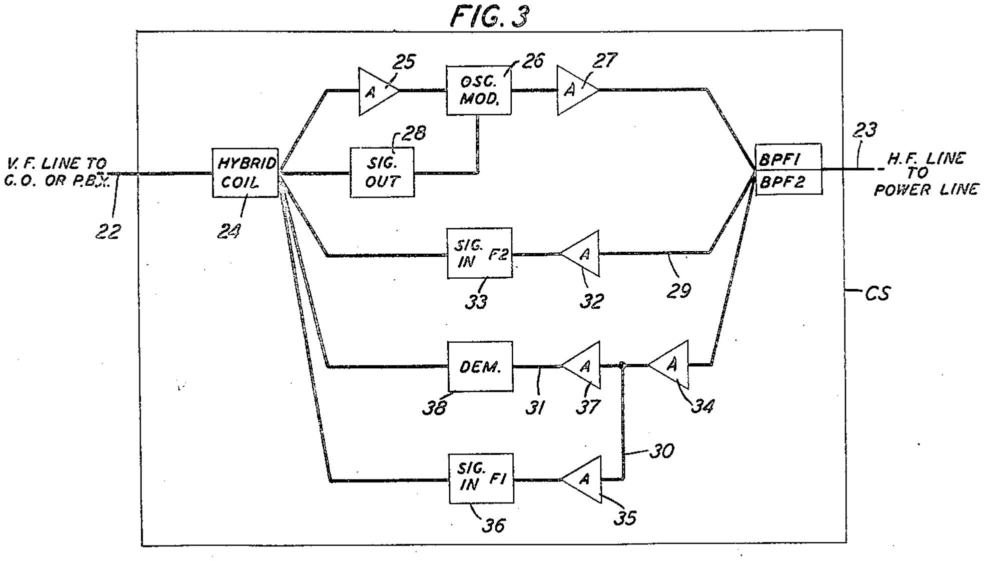
Figure 4:
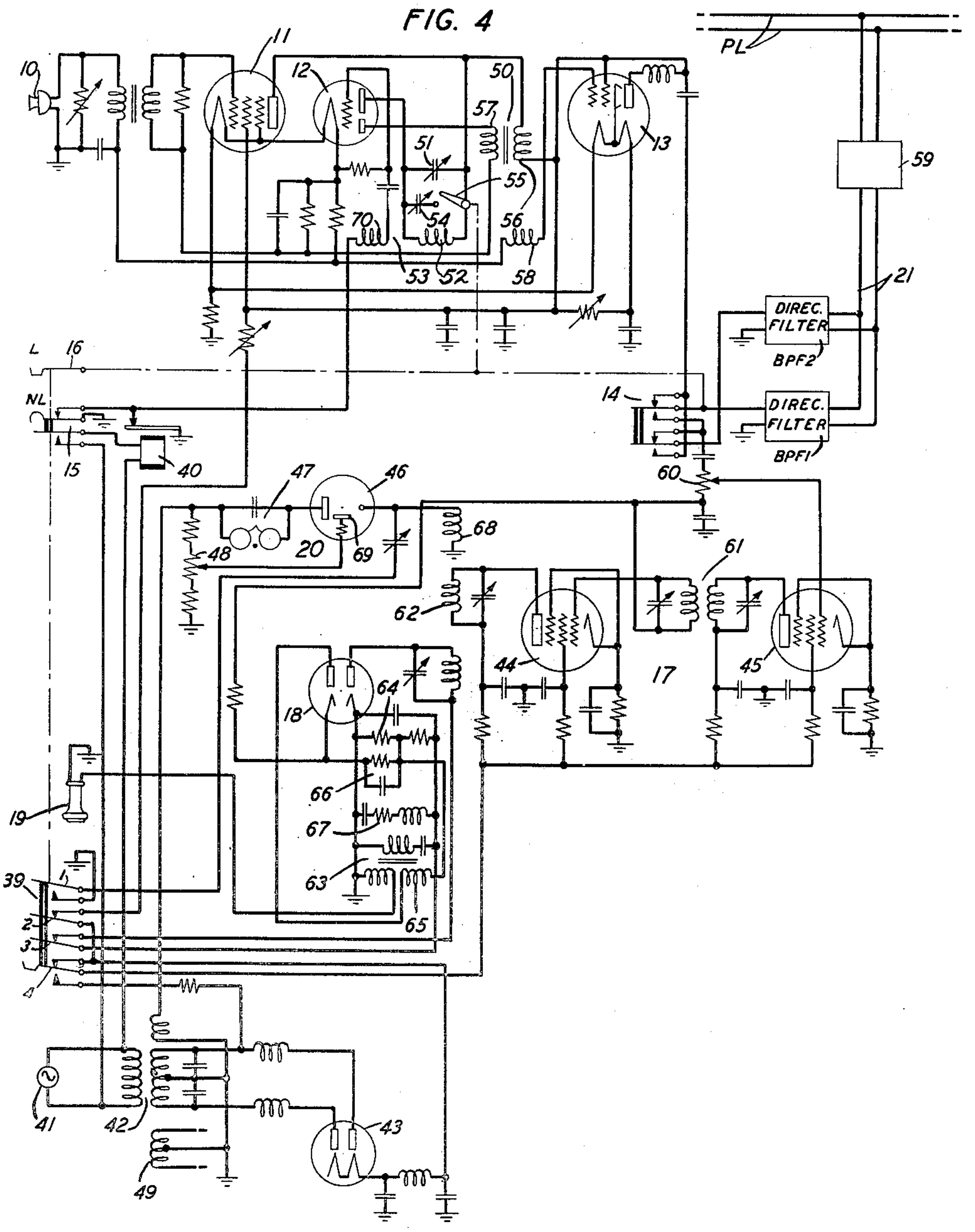
Figure 5:
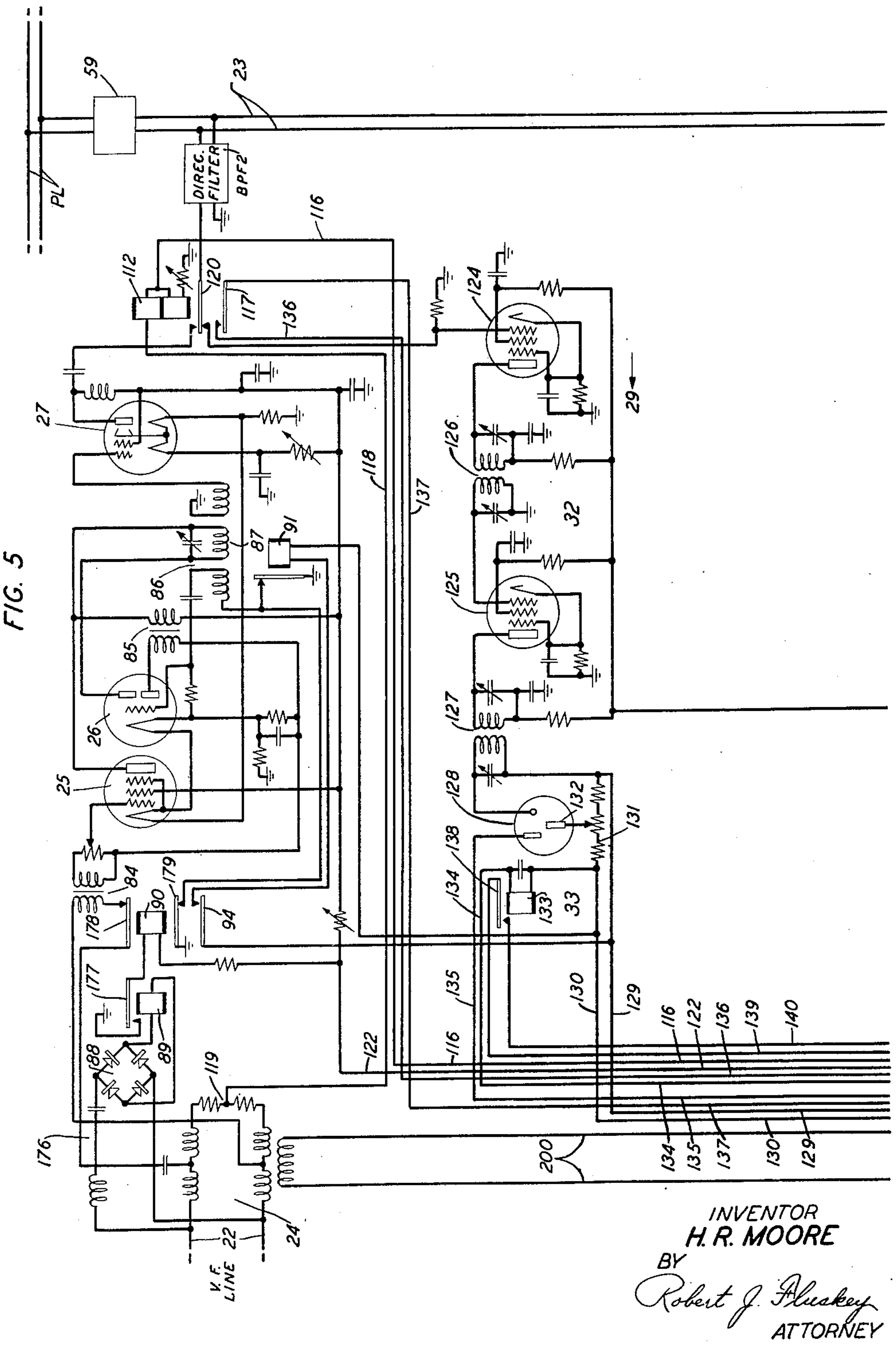
Figure 6:
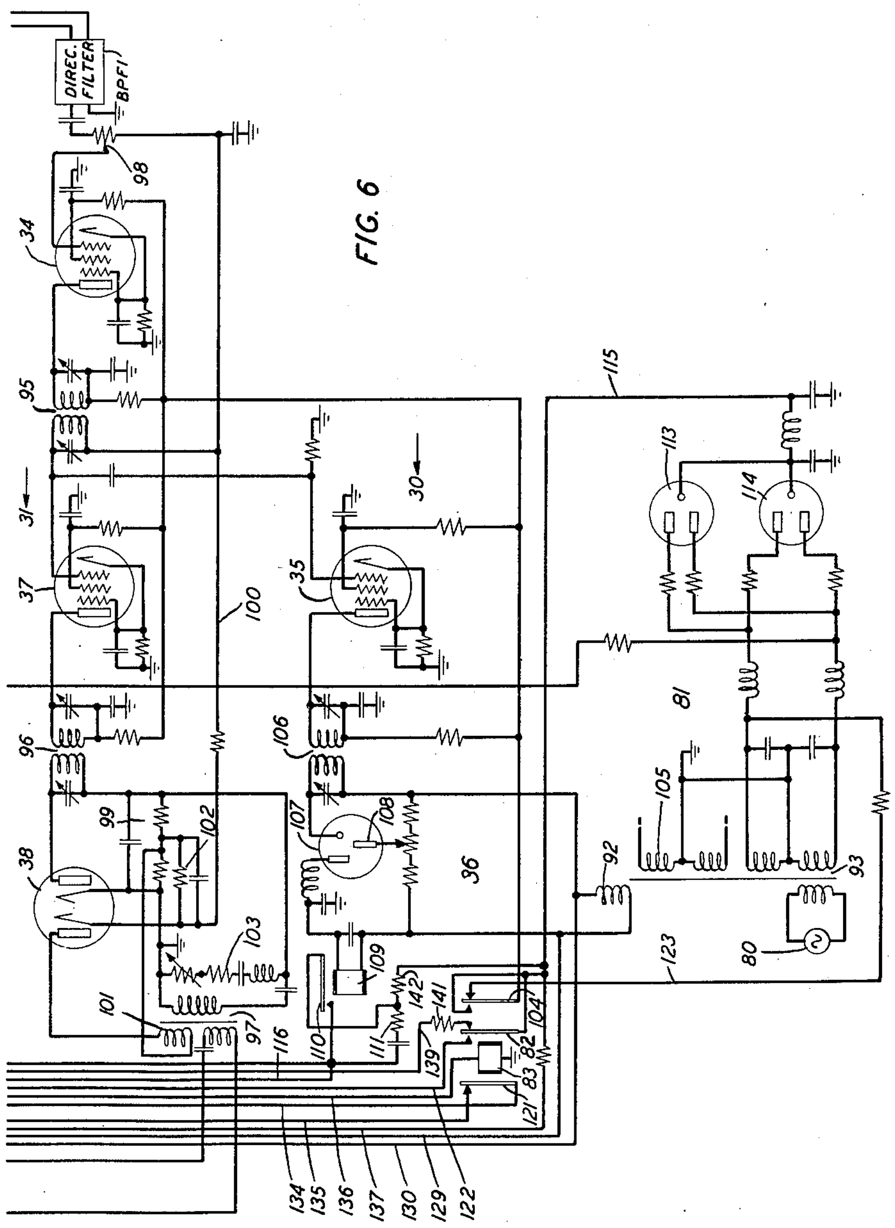
Figure 7:
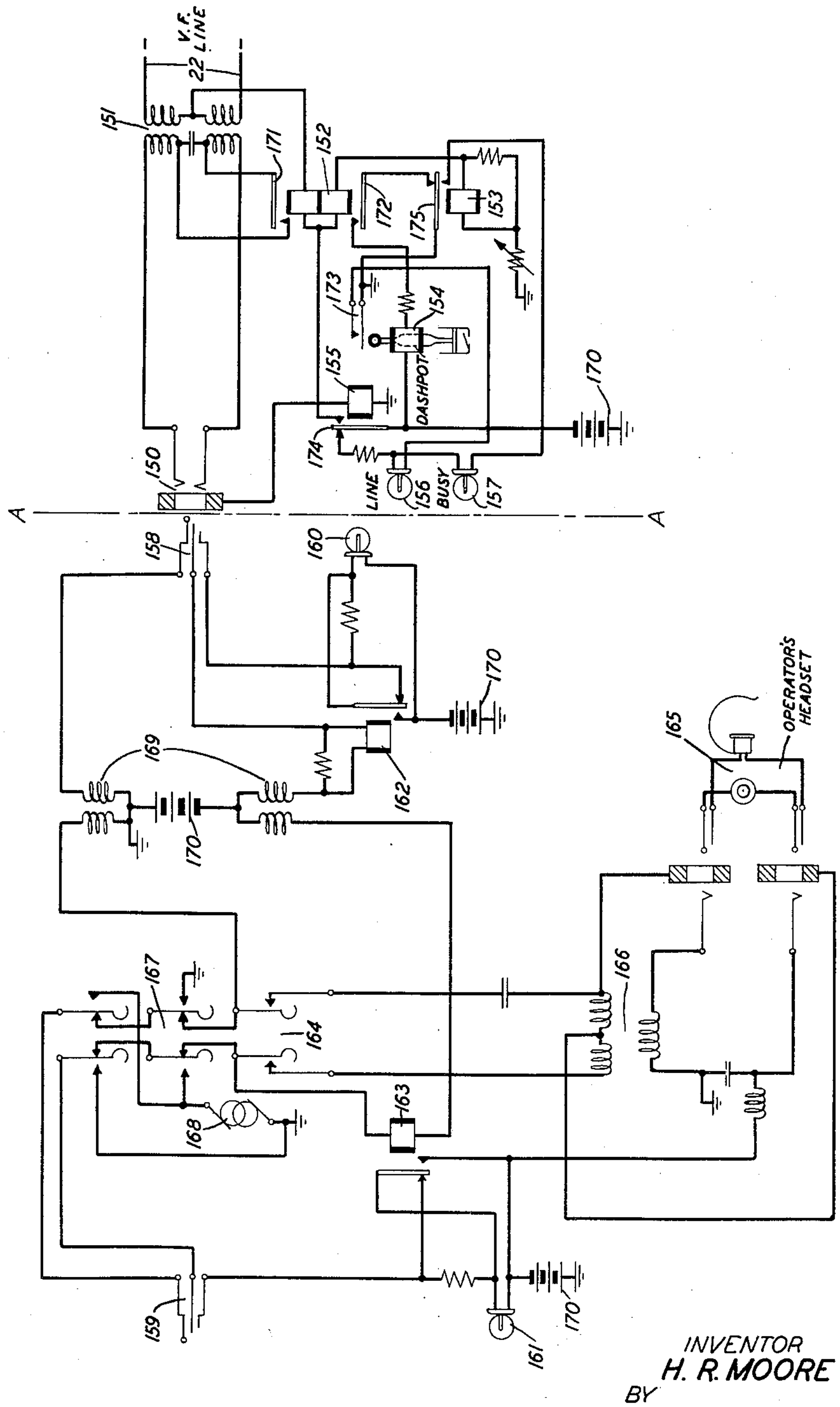

Fig. 3 is a block diagram representation of the carrier wave terminal that may be included in the system of Fig. 1, for interconnecting the power line with a central office or private branch exchange (P. B. X);

Fig. 4 shows a detailed circuit arrangement for the subscriber stations of the system of Fig. 1;

Figs. 5 and 6 show a detailed circuit arrangement for the carrier terminal of the system of Fig. 1; and Fig. 7 shows the circuit arrangement at the central office or private branch exchange with which the carrier terminal interconnects the subscriber stations in the system of Fig. 1.

Fig. 1 shows a general arrangement in which the invention may be embodied. It comprises a plurality of high frequency or carrier wave subscriber stations S1, S2 and a high frequency or carrier wave terminal or station CS coupled to a power line PL. The carrier terminal CS is connected to a central office or P. B. X whereby, through the latter, the stations S1, etc., may be connected to telephone subscribers of a conventional telephone system and, over the power line, the stations S1, etc., may be connected with one another for telephonic communication purposes. As will be brought out in greater detail hereinafter, such communication in and out of the subscriber stations may be on more than one carrier frequency.

In brief, each subscriber station coupled to the power line is adapted, on calls to a telephone subscriber of an outside or other telephone system through the central office or P. B. X by way of the carrier terminal, for amplitude-modulated carrier wave transmitting or receiving on a high frequency or carrier wave F1 and a high frequency or carrier wave F2, respectively; for signaling out to the central office on interrupted high frequency or carrier wave F1; and for being signaled from the central office through the carrier terminal on interrupted high frequency or carrier wave F2. On calls to another subscriber station coupled to the power line, the one subscriber station is adapted for amplitude-modulated carrier wave transmitting and receiving on high frequency or carrier wave F2 and on high frequency or carrier wave F1, respectively; and for signaling out to the second station on interrupted high frequency or carrier wave F2.

In brief, the carrier terminal is adapted for amplitude-modulated carrier wave transmitting and receiving on high frequency or carrier wave F2 and high frequency or carrier wave F1, respectively; for signaling out to the power line subscriber stations on interrupted carrier wave F2; and for signaling in from the power line subscribed stations on interrupted carrier waves F1 and F2; the carrier terminal being adapted to convert the interrupted carrier waves F1, F2 into currents of different characters for exciting separate indicators at the central office or P. B. X.

Figure 2:
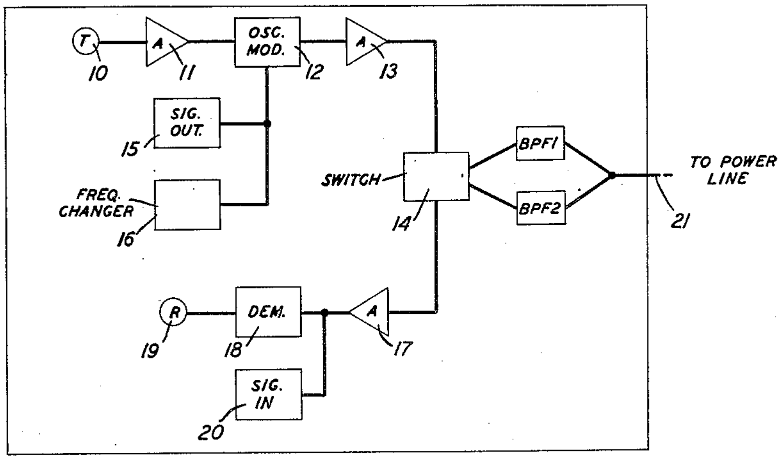
Fig. 2 is a block diagram representation of a subscriber station that may be included in the system of Fig. 1.

Fig. 2 is a block diagram representative of one of the power line subscriber stations. The transmitting path or circuit comprises a sound wave energy pickup device or microphone 10; voice frequency current amplifying means 11; oscillation-modulation means 12; amplifying means 13, for amplifying the modulated or the interrupted carrier wave output of the means 12; switching means 14; band-pass filters BPF1, BPF2, depending on whether transmission out is on carrier wave F1 or carrier wave F2; station signaling means 15; and oscillation-frequency changing means 16. The receiving path or circuit comprises band-pass filter BPF1 or BPF2, depending on whether the station is receiving on carrier wave F1 or carrier wave F2; switching means 14; high frequency amplifying means 17; demodulation means 18; sound wave energy reproducer or telephone receiver 19; and station signaling means 20. The subscriber station circuits are connected to the power line over a transmission line 21. The subscriber station will be described in greater detail with reference to Fig. 4.

Fig. 3 is a block diagram representative of the carrier terminal CS. The latter is connected by a voice frequency and direct current transmission line 22 to the central office or P. B. X, and to the power line by a high frequency transmission line 23. The transmitting path or circuit of the carrier terminal comprises hybrid coil 24; audio frequency amplifying means 25; oscillation-modulation means 26; modulated or interrupted carrier wave amplifying means 27; high frequency band-pass filter BPF2; and signaling out means 28. The receiving path or circuit comprises a signaling in circuit 29 for interrupted high frequency or carrier wave F2; a signaling in circuit 30 for interrupted high frequency or carrier wave F1; and a circuit 31 for incoming amplitude-modulated high frequency or carrier wave F1. Circuit 29 comprises band-pass filter BPF2; high frequency amplifying means 32; signal converting means 33; and hybrid coil 24. Circuit 30 comprises band-pass filter BPF1; high frequency amplifying means 34, 35; signal converting means 36; and hybrid coil 24. Circuit 31 comprises band-pass filter BPF1; high frequency amplifying means 34, 37; demodulation means 38; and hybrid coil 24. The carrier terminal will be described in detail with reference to Figs. 5 and 6.

To the extent required for an understanding of the invention the central office or P. B. X arrangement will be described with reference to Fig. 7, in connection with the detailed descriptions of the subscriber station and the carrier terminal.

*Power line system subscriber station*

With specific reference to Fig 4, the circuit arrangement of a subscriber station for the power line carrier telephone system of Fig. 1 will now be described in detail. Although shown as separate components, the microphone 10 and the receiver 19 may be included in a handset normally (that is, when the subscriber station is idle or not in use) supported on the hook of a hook-switch 39. The electronic devices, the microphone and the relay 40 receive their energizing currents and potentials from an alternating current source 41, either as alternating current, or as direct current through transformer 42 and the double-diode rectifying device 43. During the idle or not-in-use condition of the subscriber station, alternating current is supplied to the anodes of electron discharge devices 44, 45 of amplifying means 17 through the lower contact of hookswitch spring 4; to the starter and main anodes of cold cathode gas tube 46 through ringer 47 and potentiometer 48 of the signaling in circuit 20; and to the heater filaments (not shown) for devices 44, 45 and for demodulation means 18 from winding 49 of the transformer 42. The amplifying means 11, 13 and the oscillation-modulation means 12 may be electron discharge devices having directly heated filamentary cathodes, the heating current circuit therefor being open, during the idle condition of the subscriber station, at the upper contact of hookswitch spring 2. With the handset on the hookswitch, the input circuit to demodulation means 18 is open through the upper contact of hookswitch spring 3, and the input network connected to the cathode of tube 46 is grounded through the lower contact of the hook-switch spring 1. The source 41 may be the power line included in the carrier telephone system.

The audio frequency amplifying means 11 may comprise a pentode whose input electrodes are transformer coupled to the microphone 10. The oscillation-modulation means 12 may comprise a dual-purpose electronic device having a triode section and a diode section. The triode section is employed as an oscillator-modulator, modulating being accomplished by one winding 56 of a transformer 50 which acts as a modulation choke, being located in the anode or plate circuit of both the oscillator-modulator and the amplifying means 11. The oscillator may be tuned to the desired high frequency or carrier wave F1 by means of a variable capacitor 51 connected across the winding 52 of the oscillator-modulator output transformer 53. The second variable capacitor 54 is provided for tuning the oscillation circuit to the second high frequency or carrier wave F2 used in the system, the second capacitor normally being disconnected, but adapted to be included in the oscillation circuit upon closure of switch 55 following operation of frequency changing means or key 16. A portion of the modulated carrier wave output of the means 12 derived through winding 57 of the modulation choke, is rectified in the diode section of means 12, and applied to the input grid of means 11 to provide a certain amount of compression, that is, weak speech inputs to the microphone 10 are to be amplified more than loud inputs. The output of the oscillator-modulator is applied to the input of the high frequency amplifying means 13 through a second winding 58 of the transformer 53. The means 13 may be a beam power pentode type amplifier, its output being supplied to the power line through the switching means 14, the directional band-pass filter BPF1 or BPF2, line 21, and appropriate means 59 inserted in the line 21 for protecting the subscriber station against the high potentials that may exist on the power line.

The receiving circuit is connected to the power line through the protective means 59; line 21; band-pass filter BPF1 or BPF2; switching means 14; and an input potentiometer 60. The high frequency amplifying means 17 comprises a pair of pentode amplifier devices 44, 45 interconnected by a double-tuned interstage transformer 61, the output of device 44 being coupled to the circuit 20 and to the demodulation means 18 through a second double-tuned, three-winding interstage transformer 62. The interstage transformers 61, 62 are arranged to have slightly greater than critical coupling so as to have a double-hump characteristic, the two peaks being tuned to the two frequencies required in the operation of the system. The amplified output of the means 17 is adapted to be applied across one diode section of the demodulation means 18, to reduce the modulated carrier wave to voice frequency currents, directed to the receiver 19 through voice frequency transformer 63, and to direct current potential developed across the diode load resistance 64, a portion of which potential is fed back to the input grids of the devices 44, 45 to provide automatic volume control. By means of a third winding 65 of the transformer 63, a portion of the voice frequency output of the means 18 is applied across the second diode section thereof, to develop a potential across the resistor 66 for application to the input grids of the devices 44, 45 to enable a small amount of expansion, to compensate, in part, for the compression introduced at the transmitting end. The network 67 may be included for equalization purposes.

The subscriber station signaling in circuit 20, that is, the circuit at the subscriber station to indicate that the station is being called or signaled, is coupled to the output of the amplifying means 17 through the winding 68 of transformer 62. An alternating current voltage lower than that required to break down the gas tube 46 is applied to the latter's starter anode 69. The ringer 47 is tuned electrically and mechanically to a submultiple of the frequency of the alternating current source 41, which may be a 60-cycle per second source. When an incoming carrier wave is selected and received at the subscriber station, carrier wave voltage is applied to the cathode of the gas tube during the positive peaks of each cycle of the 60-cycle alternating current potential applied to the plates or anodes of devices 44, 45, that is, when the subscriber station is in idle condition. This voltage will be sufficient to trigger off or flash the tube 46 while carrier wave is on the power line, or until the hookswitch is operated by removal of the handset therefrom to open the input circuit of the tube 46 at the lower contact of hookswitch spring 1. This flashing at a 60-cycle rate provides a visual indication at the subscriber station that the power line is in use. If, however, the incoming carrier wave is one interrupted at the submultiple rate to which the ringer is tuned, for example, 30 cycles per second, the tube 46 will trigger or flash over only on alternate cycles of the amplifier's plate potential, thereby causing the ringer 47 to operate and to give an audible signal at the subscriber station. Removal of the handset from the hookswitch opens the gas tube input circuit, and silences the ringer, as well as changing the potential supplied to the anode of devices 44, 45 to direct current potentials through the upper contact of hookswitch spring 4.

Signaling out of the subscriber station is accomplished by removing the handset from the hookswitch to energize the transmitting circuit, and by closing the key 15. This applies 60-cycle alternating current to relay 40, which may be tuned mechanically so that it operates on a subharmonic, for example, 30 cycles per second. The oscillation winding 70 of the oscillation-modulation means 12 is normally connected to ground through the upper contact of key 15 and the armature and contact of relay 40. Removal of ground at key 15, and operation of relay 40, interrupts the oscillation circuit at a 30-cycle rate to interrupt the carrier wave at the same rate, the interrupted carrier wave being amplified by means 13 and transmitted to the power line by switching means 14, the directional filter and the line 21. In the event that signaling out of the subscriber station is to be done by means of a calling dial, the interrupter contacts of the dial could be inserted in the circuit for the winding 70.

As already noted, the circuit of the subscriber station is normally arranged for transmitting on carrier wave F1 and receiving on carrier wave F2 through the carrier terminal to and from the central office or P. B. X. For calls directly between subscriber stations coupled to the power line, however, the calling station must invert its operating frequencies, so as to signal out and to transmit on carrier wave F2 and to receive on carrier wave F1. This inversion is accomplished through the operation of frequency changing means or key 16, which preferably is of the locking type, after the handset is removed from the hookswitch 39. Operation of the key 16 closes switch 55, thereby changing the constants of the oscillation generating circuit of the oscillation-modulation means 12; and operates switching means 14, to open the upper contacts and to close the lower contacts thereof, whereby band-pass filter BPF1 is connected to the input of the subscriber station's receiving circuit, and band-pass filter BPF2 is connected to the output of the subscriber station's transmitting circuit. Simultaneously, the relay 40 is operated to interrupt the carrier wave F2 at a 30-cycles per second rate. No change other than in the directional filter associated with it is required in the receiving circuit upon inversion of the carrier wave frequencies, since the receiving circuit transformers are tuned to the two carrier wave frequencies involved. Obviously, code signaling may be employed from the subscriber station for such calls local to the power line system. A mechanical interlock between the frequency changing key and the hookswitch may be provided, so that replacement of the handset on the hookswitch restores the subscriber station to its normal transmitting and receiving frequencies condition.

In a subscriber station such as has been described, constructed in accordance with the invention, all of the components thereof were mounted on a metal chassis and enclosed by a cover to provide an assembly measuring approximately 6'' x 14'' x 9''. The frequency changing and signal out keys or pushbuttons were accessible through the cover, which contained a window, through which the glow of the gas tube 46 was observable. The hook of the hookswitch protruded from the assembly, making the handset readily available.

*Carrier terminal for power line system*

The carrier terminal will now be described with specific reference to Fig. 5 and Fig. 6. In accordance with the invention, the carrier terminal transmitting circuit is adapted to function only on a carrier wave F2. The transmitting circuit comprises the audio frequency amplifying means 25, for example, a pentode electron discharge device; the oscillation-modulation means 26, for example, a dual-purpose electron discharge device having a triode section and a diode section; and the interrupted and modulated carrier wave amplfying means 27, for example, a beam power pentode type amplifying electron discharge device. These devices may be of the filamentary cathode type obtaining their direct current energizing current and potentials from an alternating current source 80 through the circuit 81 and the front contact of armature 82 of the relay 83. Normally, that is, when a talking or a signaling circuit is not established between the central office or P. B. X and one of the subscriber stations coupled to the power line, the transmitting circuit is not energized. The input electrodes of the means 25 are coupled to the line 22 through the hybrid coil 24 and input transformer 84. Transformers 85, 86 are analogous to the transformers 50, 53 of the subscriber station, but winding 87 of the transformer 86 is tuned by a single variable capacitor only to the high frequency or carrier wave F2. Full-wave rectifier 88, for example, of the solid rectifier type, and relay train including relays 89, 90, are connected to the line 22 for signaling out from the central office or P. B. X in a manner to be explained hereinafter. Relay 91 corresponds in function to relay 40 of the subscriber station, in being provided to enable interruption of the oscillation circuit of the oscillation-modulation means for signaling out to the power line system. Relay 91 dervies its energizing current from the source 80 through winding 92 of the transformer 93, under control of the relay 90, through the latter's armature 94 and associated contact.

The modulated carrier wave receiving circuit at the carrier terminal comprises line 23; directional band-pass filter BPF1; input potentiometer 98; amplifying means 34, 37, which may be pentode type electron discharge devices; interstage transformers 95, 96, tuned only to the high frequency or carrier wave F1; demodulation means 38, which may comprise a double-diode; and voice frequency transformer 97, connecting the output of the demodulation means to the line 22, over conductors 200 and the hybrid coil 24. As in the receiving circuit of the subscriber station, a portion of the detected output of the demodulation means 38 developed across the diode load network 99, may be fed back through the conductor 100 to the input grids of the devices 34, 37 for automatic volume control; and a portion of the voice frequency output of the means 38, derived through the third winding 101 of transformer 97, is applied across the second diode section of the means 38 to develop a potential across the network 102 for application to the input grid of the devices 34, 37, to enable a small amount of expansion to compensate, in part, for the compression at the transmitting end, that is, at the subscriber station. The network 103, connected across the primary winding of transformer 97, may be provided for equalization purposes.

The anodes of the device 34, 37 are normally energized by alternating current potential supplied from the rectifying circuit 81 through the back contact of armature 104 of relay 83. When the relay 83 is energized, the alternating current potential is replaced by a direct current potential from the rectifying circuit 81 through the front contact of armature 104. The deves 34, 37, 38 may be of the indirectly heated cathode type, the heater filaments thereof (not shown) being heated continuously by alternating current from heater current winding 105 of the transformer 93.

The amplifying means 35, for example, a pentode type electron discharge device, is bridged across the input to the amplifying means 37 of the modulated carrier wave receiving circuit 31. The output circuit of means 35 is coupled through the transformer 106, which is tuned to the high frequency or carrier wave F1 only, to the input circuit of a cold cathode gas-filled tube 107, which may be similar to the tube 46 of the subscriber station circuit. The starter anode 108 of tube 107 is normally maintained, from the source 80 through winding 92, at an alternating current potential just below the trigger or flash-over potential for the tube. The device 35 is normally supplied with alternating current anode potential from circuit 81 through back contact of armature 104 of relay 83, and with heater filament (not shown) current from winding 105 of transformer 93. Whenever carrier wave F1 is incoming to the carrier terminal from the power line, the amplified high frequency current input to the cathode-starter anode circuit of tube 107 is sufficient to produce enough ionization in the tube 107 to cause it to trigger-off or flash-over through the main anode of tube 107. Such triggering-off energizes the relay 109 with a pulsating direct current at the frequency rate of the source 80, for example, 60 cycles per second, the relay 109 being of a type that will hold over between successive pulses. It will be observed that this gas tube circuit is analogous in some respects to the gas tube circuit of Fig. 4.

Closure of the contact associated with the armature 110 of relay 109 cuts out the direct current blocking network 111, and completes an energizing circuit for relay 112 from ground at the circuit 81, through rectifier tubes 113, 114, wire 115, armature 110 and contact, wire 116, lower winding of relay 112 to ground. Armatures 120, 117 of relay 112 pull up to connect the output circuit of amplifying means 27 to the power line through upper contact of armature 120, band-pass filter BPF2 and line 23; to disconnect the amplifying means 32 from the power line by the opening of the lower contact of armature 120; and to complete, over wires 115, 136, 137, an energizing circuit for relay 83 through the upper contact of armature 117. Simultaneous with the energizing of relay 112, direct current is supplied to line 22 through the upper winding of relay 112, wire 118, and the balancing network 119 of the hybrid coil, to operate a relay sequence at the central office or P. B. X, to produce a visual indication or signal thereat, which is referred to in more detail hereinafter. Energization of relay 83 causes the latter's armatures 82, 104, 121 to pull up, to open the main anode circuit of means 33, normally complete over wires 134, 135, at the front contact of armature 121; to close a direct current heating current and anode potential circuit for the devices 25, 26, 27 of the carrier terminal's transmitting circuit, over wires 115 and 122 through the front contact of armature 82, to prepare the transmitting circuit for outgoing transmission; to close, through the front contact of armature 104, a direct current anode potential supply for the device 35 over wires 115, 123, to replace the alternating current supply interrupted by the opening of the back contact of armature 104; and to prepare an energizing circuit for relay 90. Cessation of carrier wave F1 incoming to the carrier terminal results in deenergization of relay 109, and restoration of relays 112, 83 and associated circuits to the condition existing prior to their energization.

The third receiving circuit 29 at the carrier terminal comprises the amplifying means 32, including a pair of pentode type electron discharge devices 124, 125 interconnected by an interstage transformer 126, tuned to the carrier wave F2 only, the output circuit of device 125 being coupled to the input circuit of the signal converting means 33 through a second transformer 127, tuned to the carrier wave F2 only. This circuit functions when one of the subscriber stations coupled to the power line is connected with a second subscriber station on the power line, or is signaling such a second station, and, consequently has inverted its normal transmitting and receiving frequencies, and is transmitting on carrier wave F2 and receiving on carrier wave F1. The means 33 comprises a cold cathode gas-filled tube 128 whose electrodes are normally continuously supplied with alternating current from the source 80, through transformer winding 92, the conductors 129, 130 and potentiometer 131. The starter anode 132 of tube 128 is at a potential slightly below that required to cause the tube to trigger-off or flash-over. The flash-over occurs when carrier wave F2 is incoming to the carrier terminal through band-pass filter BPF2, armature 120 and amplifying means 32. Amplified carrier wave F2 applied to the electrode of tube 128 through transformer 127 will produce sufficient ionization in the tube between the starter anode and the cathode to cause breakdown between the main anode and the cathode. Pulsating direct current will thereby be supplied to the relay 133, which may be of the type that holds up during the intervals between successive pulses. Closure of the lower contact of armature 138 of relay 133 completes a circuit to supply direct current from the rectifying circuit over wire 115, back contact of armature 82 of relay 83, wire 139, armature and contact of relay 133, wires 140, 116, upper winding of relay 112, wire 118, balancing network 119 and hybrid coil 24, and the simplex circuit of line 22, to the central office or P. B. X to operate, at the latter, a relay sequence to produce a visual indication or signal at the central office or P. B. X, which is referred to in more detail hereinafter, of the fact that the power line is being used by one of the subscribers thereon for a call local to the power line subscribers. Resistors 141, 142 are chosen of such values that the direct current voltages supplied to the central office or P. B. X upon operation of relays 133, 109, are of different magnitudes for the carrier waves F1, F2 incoming to the carrier terminal. Cessation of carrier wave F2 incoming to circuit 29 results in deenergization of relay 133, and release of the central office relay sequence to extinguish the visual "busy" signal at the latter.

A carrier terminal constructed in accordance with the invention, with all the components thereof mounted on a metal chassis and including a cover, measured approximately 10" x 17" x 9".

*Central office arrangement*

Fig. 7 shows as much of the central office or P. B. X as is necessary to an understanding of the invention. The circuit arrangement to the right of the line A—A is representative of the switchboard circuits peculiar to the voice frequency line 22 for the power line carrier telephone system. That portion of Fig. 7 to the left of line A—A is representative of a conventional common battery switchboard cord circuit.

The line 22 is coupled to a switchboard line jack 150 through a repeating coil 151. The relays 152, 153 are adapted for energization by the direct current voltages applied to line 22 upon energization of the relays 109, 133 at the carrier terminal. Relay 154 is a slow-operate type of relay, and relay 155 is associated with the circuit for line lamp 156. Lamp 156 is adapted to be operated as a visual signal to the central office attendant or operator to indicate a call incoming from a subscriber station on the power line, and lamp 157 to indicate that the power line is in use or "busy" on a call between stations on the power line.

The cord circuit comprises cord jacks 158, 159; cord lamps 160, 161 and relays 162, 163; talking and listening key 164, and associated operator's headset 165 and operator's circuit 166; ringing key 167 and associated ringing current source 168; repeating coil 169; and common battery 170. The source 168 may provide conventional 20 cycles per second ringing current.

With respect to the circuit arrangement of Fig. 7, let it be assumed that a direct current voltage has been applied to line 22 by virtue of the operation of relay 109 at the carrier terminal as described with reference to Figs. 5 and 6. This will cause relay 152, but not relay 153 to be operated. Closure of lower contact of armature 171 shunts the condenser in repeating coil 151, and closure of the upper contact of armature 172 closes an obvious energizing circuit for relay 154. When the latter operates to close contact 173 associated therewith, line lamp 156 is lighted over a circuit including the front contact of armature 174 of relay 155, to give a visual indication to the central office operator or P. B. X attendant that a power line subscriber station is calling in. Insertion of cord plug 158 in jack 150 provides an obvious circuit for energizing relay 155, to open the line lamp circuit at the relay's front contact and to close a holding circuit for relay 152 through the back contact of armature 174.

If it is assumed, however, that it is the relay 133 at the carrier terminal that has been energized, and that, consequently, a different magnitude of direct current voltage has been applied to the line 22, relay 153 will be operated as well as relay 152. Energization of relay 153 opens the upper contact and closes the lower contact of armature 175, to provide a circuit from ground of contact 173, armature 175, lamp 157, armature 174 to battery 170, thereby lighting lamp 157 to indicate that carrier wave F2 is on the power line as a result of a subscriber station having inverted frequencies for a local call and, consequently, that the power line is "busy." Since, prior to the inversion of frequencies by the subscriber, some carrier wave F1 may be transmitted to the power line and, hence, cause relay 109 to be energized, relay 154 is of the slow to operate type to preclude the lighting of lamp 156 until a preassigned interval after the power line station is connected to the power line for a call outgoing therefrom.

*Call to outside system subscriber from a power line subscriber station*

The subscriber at the power line station removes his handset from its hookswitch after noting that the visual indicator gas tube 46 is extinguished. The transmitting circuit at the calling station is energized from the source 41, and carrier wave F1 is transmitted over the power line to the carrier terminal and to each of the other subscriber stations on the power line. Carrier wave F1 incoming to the other power line stations causes the gas tube 46 thereat to glow, thereby providing a visual indication that the power line is in use. Carrier wave F1 incoming to the carrier terminal is effective on the signaling-in circuit 30 thereat to energize relay 109, and to apply direct current voltage to relay 152 at the central office or P. B. X to cause the line lamp 156 to be lighted. Operation of relay 109 simultaneously causes energization of relay 112 to connect band-pass filter BPF2 to the output circuit of the carrier terminal transmitting circuit, and to disconnect the carrier terminal signaling circuit 29 from the line 23; and the energization of relay 83, to furnish energizing currents and potentials to the electronic devices of the carrier terminal transmitting circuit, thereby placing carrier wave F2 on the power line, and to open the output circuit of the tube 128 of circuit 29. When the line lamp 156 lights up, the operator or attendant at the central office or P. B. X inserts her cord plug into jack 150 thereby operating relay 155 to extinguish the line lamp; to energize cord circuit relay 162 to cut out the cord lamp 160; and to apply direct current from battery 170, through back contact of armature 174, relay 152, the simplex of line 22, and the wire 118, to the relay 112 to maintain the latter energized. By operation of the key 164 in the cord circuit, the operator or attendant may connect her headset 165 through the cord circuit to the line 22 and talk out over the power line system on carrier wave F2, and receive from the calling subscriber station on carrier wave F1. After ascertaining the necessary information with reference to the desired party, the operator sets up the connection to the desired party in the conventional manner. When the call is completed and the power line subscriber station is restored to normal or idle condition by restoration of its handset to the station hookswitch, cessation of carrier wave F1 on the power line releases relays 109, 152 with resulting release of relay 162 in the cord circuit to cause the cord lamp to be lighted. The removal of the cord plug from the line jack 150 opens the energizing circuit for relay 155 thereby removing battery from relay 112 at the carrier terminal to release relay 83 and to restore the carrier terminal to its normal or idle condition. Cessation of carrier wave F2 output from the carrier terminal causes the gas tube 46 at each carrier line subscriber station to be extinguished.

*Call to power line subscriber station from central office or P. B. X*

The operator initiates the connection in conventional manner by inserting one end of her cord circuit into the line jack 150. Operation of relay 155 opens the circuit of lamps 156, 157, and connects battery 170 through back contact of armature 174, relay 152 and mid-point of the carrier terminal side of repeating coil 151, to the line 22 to energize relay 112 through network 119 and wire 118. Operation of relay 112 connects the carrier terminal transmitting circuit to the power line through band-pass filter BPF2; disconnects the carrier terminal receiving circuit 29 from line 23; and operates relay 83, thereby preparing an energizing circuit for carrier terminal relay 90 through front contact of armature 82 of relay 83, and completing the energizing circuit, over wire 122, for the carrier terminal transmitting circuit to place carrier wave F2 on the power line. Presence of the high frequency F2 on the power line causes the tube 46 at each of the subscriber stations to glow, providing a visual indication at each station that the line is in use. Operation by the operator of the ringing key 167 transmits ringing current, for example, at 20 cycles per second, over line 22 to the carrier terminal. The ringing current is applied through tuned circuit 176 and full wave rectifier 88, to provide energizing current for relay 89. Closure of lower contact of armature 177 of relay 89 completes the energizing circuit for relay 90, which pulls up to disconnect the carrier terminal transmitting circuit from the line 22 at the upper contact of armature 178; to remove ground from the oscillation circuit of the means 26 at the lower contact of armature 179; and to complete, through upper contact of armature 94, the alternating current energizing circuit for relay 91 from winding 92 of rectifying circuit 81. Relay 91 is tuned mechanically to 30 cycles per second, and interrupts the outgoing carrier wave F2 at that rate. The audible signal or ringer 47 at each power line subscriber station will respond, and, by code ringing on the part of the operator, the desired subscriber station is notified that the call is incoming to it. When the called party answers by removing the station handset from its associated hookswitch, and causes transmission of carrier wave F1 over the power line to the carrier terminal, relay 109 of the carrier terminal receiving circuit 30 is operated to continue relay 112 operated, and to transmit direct current voltage to the central office to operate relay 152 thereat, and, hence, cord circuit relay 162, to extinguish the cord lamp 160. When the called power line subscriber hangs up, cessation of carrier wave F1 on the power line causes relays 109 and 152 to release, and removal of the cord circuit plug from the line jack 150, releases relay 112 to restore the carrier terminal to its normal or idle condition.

*Call between stations on the power line*

In a call between stations on the power line, the operator or attendant at the central office or P. B. X is not involved. In such a call, the calling party removes the station handset from its associated hook switch, and operates the frequency changing key at the station to invert the normal carrier wave relations. The calling station, therefore, will be transmitting on carrier wave F2, and will be adapted to receive on carrier wave F1. Presence of carrier wave F2 on the power line will cause the visual signal or gas tube 46 at each power line station to glow, thereby indicating that the power line is in use, and, as explained with reference to the signaling-in receiving circuit 29 of the carrier terminal, will cause the lamp 157 at the central office to be lighted to indicate to the operator or attendant thereat that the power line is in use on a local call. By signaling in accordance with the signaling code for the system, the calling subscriber causes operation of the audible signal or ringer at each subscriber station, thereby notifying the desired station that the call is incoming to it. When the call is completed, and the calling party restores the handset to its associated hookswitch and automatically restores the normal frequency relations at the station, cessation of carrier wave F2 on the power line releases relay 133 of the carrier terminal receiving circuit 29, and causes the lamp 157 at the central office to be extinguished.

Although this invention has been disclosed with reference to a specific embodiment, it is to be understood that it is not limited thereto, but that it is susceptible of modifications without departing from the spirit and scope of the invention.

What is claimed is:

1. In combination with a carrier communication system including a transmission line and a plurality of subscriber stations and a carrier terminal with associated attended central switching office, said stations and terminal being coupled to said line, means at each of said subscriber stations under control of the subscriber thereat for normally supplying communication signals on an uninterrupted carrier wave of one frequency to said line for transmission thereover to said carrier terminal and for receiving communication signals on an uninterrupted carrier wave of a second frequency incoming over said line from said carrier terminal for calls between the subscriber station and a telephone station outside of the carrier system through said central office, and for reversing the transmitting and receiving carrier frequencies for a call between two subscriber stations on said line, means at the carrier terminal comprising a source of current, means for deriving two distinct values of current from said source, separate means respectively operating in response to the uninterrupted received normal and uninterrupted received reversed frequency carrier waves for supplying a respective one of said values of current to said central office, and means at said central office responsive to one of said values of current to signal the operator at the central office to establish the required supervision in the case of a call to an outside telephone station and responsive to the other of said values of current to establish a busy signal at the central office in the case of a call between two subscriber stations on the transmission line.

2. A telephone system comprising a plurality of carrier wave subscriber stations for transmitting on either one of two carrier waves and for receiving on the other of said carrier waves, each station normally being arranged for transmitting on the same one of said carrier waves, and for receiving on the same other of said carrier waves; a carrier terminal station for transmitting to said subscriber stations on said other carrier wave, and for receiving from said subscriber stations on each of said carrier waves; a switching office connected with said terminal station for connecting the subscriber stations to telephone stations on another telephone system; and means at each subscriber station responsive to either carrier wave when said wave is uninterrupted to provide only a visual indication thereat that the system is in use, and responsive to either carrier wave, when the latter is interrupted at a preassigned rate, to provide both audible and visual indication at the subscriber station that a call may be incoming thereon.

3. A telephone system comprising a plurality of carrier wave subscriber stations for transmitting on either one of two carrier waves and for receiving on the other of said carrier waves, each station normally being arranged for transmitting on the same one of said carrier waves, and for receiving on the same other of said carrier waves; a carrier terminal station for transmitting to said subscriber station on said other carrier wave, and for receiving from said subscriber stations on each of said carrier waves; an attended switching office connected with said terminal station for connecting the subscriber stations to telephone stations on another telephone system; means at each subscriber station responsive to either carrier wave when said wave is uninterrupted, to provide only a visual indication thereat that the system is in use, and responsive to either carrier wave, when the latter is interrupted at a preassigned rate, to provide both audible and visual indication at the subscriber station that a call may be incoming thereon; means at the carrier terminal station responsive to one of the two uninterrupted carrier waves originated at a subscriber station, to provide a signaling current of one magnitude for transmission to the switching office for actuating an indicator at the latter to inform the operator or attendant at the switching office that a call is incoming thereto from a subscriber station; and means at the carrier terminal station responsive to the other of the uninterrupted carrier waves originated at a subscriber station, to provide a signaling current of a different magnitude for transmission to the switching office to actuate a separate indicator thereat to inform the operator or attendant at the switching office that the system is in use on a call between subscriber stations of the system.

4. A telephone system comprising a power line; a plurality of carrier wave subscriber stations coupled to said line for transmitting to said power line on either of two carrier waves, and for receiving from said power line on the other of said carrier waves, each station normally being arranged for transmitting to said power line on the same one of said carrier waves and for receiving from the power line on the same other of said carrier waves; a carrier terminal station coupled to said line for transmitting to said power line on one of said carrier waves and for receiving from said power line on each of said carrier waves; a switching office coupled to said carrier terminal station for connecting the power line subscriber stations to telephone stations outside of the power line system; and means at each subscriber station responsive to either uninterrupted carrier wave and including a tuned vibratory device and a glow discharge device to provide a visual indication only thereat that the power line is in use, and responsive to either carrier wave, when the latter is interrupted at a preassigned rate corresponding to the frequency to which the vibratory device is tuned, to provide both audible and visual indications at the subscriber station that a call may be incoming thereto.

5. A telephone system comprising a power line; a plurality of carrier wave subscriber stations coupled to said line for transmitting to said power line on either of two uninterrupted carrier waves, and for receiving from said power line on the other of said carrier waves, each station normally being arranged for transmission to said power line on the same one of said carrier waves, and for receiving from the power line on the same other of said carrier waves; means at each subscriber station for reversing the normal carrier wave relationship; a carrier terminal station coupled to the power line, for transmission to the power line on one of said carrier waves and for receiving from said power line on each of said carrier waves; an attended switching office coupled to said carrier terminal station, for connecting the power line subscriber stations to telephone stations outside of the power line system; means at the carrier terminal station responsive to one of the two uninterrupted carrier waves originated at a subscriber station, to provide a signaling current of a given magnitude for transmission to the switching office for actuating an indicator at the latter to inform the operator or attendant at the switching office that a call is incoming thereto from a power line subscriber station; and means at the carrier terminal station responsive to the other of the uninterrupted carrier waves originated at a power line subscriber station, to provide a signaling current of a different magnitude for transmission to the switching office, for actuating a separate indicator at the latter to inform the operator or attendant thereat that the power line is in use on a call between power line subscriber stations.

6. A telephone system comprising a plurality of subscriber stations and an attended switching office, in which the subscriber stations are arranged for calls therebetween independent of the switching office and for calls through said office, and including circuit means controlled from each subscriber station to actuate independent signal devices at the office for a call between two of said stations and for a call from one of said stations through said office; said circuit means comprising two high frequency receiving circuits each of which is automatically responsive to one of two different uninterrupted high frequency currents originating at the subscriber station, each high frequency circuit including a gas tube triggering device, triggering on in response to the respective uninterrupted high frequency current, to supply control currents of different magnitudes to the signaling devices at the switching office.

7. A telephone system comprising a subscriber station for telephonic communication therefrom on either of two different carrier waves and for telephonic communication thereinto on either of said two carrier waves and for signaling thereinto on either of said carrier waves; said subscriber station including a single receiving circuit tuned to said two carrier waves, and means responsive to the carrier wave output of said receiving circuit to establish a visual only or a visual and an audible signal of the state of use of said system, said means comprising a single gas-filled tube and a tuned ringer in series connection therewith, said gas-filled tube being ionizable in response to either carrier wave to provide said visual only indication when said carrier wave incoming to the receiving circuit is uninterrupted and said gas-filled device and said ringer in combination providing a visual and an audible signal when the carrier wave incoming to the receiving circuit is interrupted at the rate to which the ringer is tuned.

8. A telephone system comprising a plurality of subscriber stations for telephonic communication therefrom and thereinto on either of two different carrier waves and for signaling thereinto on either of said carriers waves; each station including a single receiving circuit simultaneously tuned to each of said carrier waves and a single means responsive to the output of said circuit to give a visual indication of the presence of either carrier wave in the system.

HILBERT R. MOORE.

REFERENCES CITED

The following references are of record in the file of this patent:

UNITED STATES PATENTS

| Number | Name | Date |
|---|---|---|
| 432,618 | Holcombe | July 22, 1890 |
| 1,773,613 | Clark | Aug. 19, 1930 |
| 1,991,383 | Fator | Feb. 19, 1935 |
| 2,202,474 | Vroom | May 28, 1940 |
| 2,289,048 | Sandalls | July 7, 1942 |
| 2,294,905 | Honaman et al. | Sept. 8, 1942 |